Dec. 10, 1963     J. VULLIET-DURAND     3,113,503
APPARATUS FOR PREPARING COFFEE
Filed Feb. 2, 1961     2 Sheets-Sheet 2

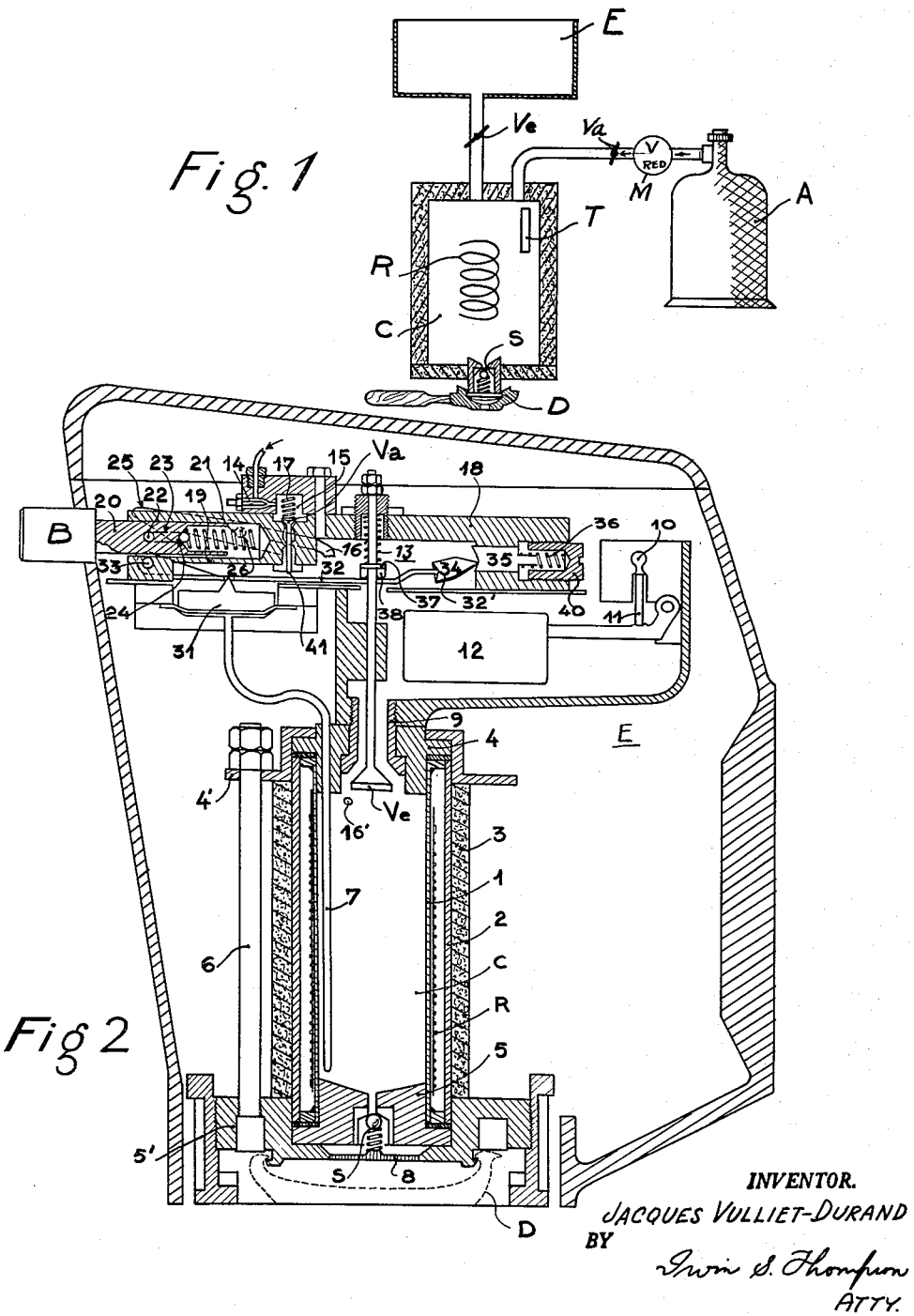

INVENTOR.
JACQUES VULLIET-DURAND
BY
ATTY.

United States Patent Office 3,113,503
Patented Dec. 10, 1963

3,113,503
APPARATUS FOR PREPARING COFFEE
Jacques Vulliet-Durand, 91 Promenade des Anglais,
Nice, Alpes-Maritimes, France
Filed Feb. 2, 1961, Ser. No. 86,762
Claims priority, application France Feb. 4, 1960
4 Claims. (Cl. 99—282)

Percolators or the like apparatus presently in use for preparing coffee always include a boiler held at the temperature required for obtaining the infusion, by any suitable supply of heat such, for instance, as a gas burner.

Such apparatus show various drawbacks and, in particular, they require the incorporation of a boiler operating under pressure and connected with the water pipes and, possibly, the gas pipes, while they are comparatively expensive. The setting of the apparatus in its operative condition is a lengthy matter, since it is necessary to heat a large amount of water and, consequently, to maintain the heating during a very long time, even if the sale of coffee is very reduced or totally halted temporarily. The permanent upkeep of such a mass of water at a temperature approximating the boiling point leads to an unnecessary expenditure of gas, without any true relationship with the amount of water consumed during the time corresponding to no demand or substantially no demand. On the other hand, the preparation of a good coffee requires driving the water through the ground coffee under a predetermined pressure. Now, said pressure may be that of the city water feeding the apparatus, in which case it varies from one city to another, or else, said pressure is obtained by special contrivances controlled by various means, which makes the whole system more intricate.

My invention has for its object an apparatus which removes these various drawbacks, while its structure is simple and its erection is easy at any point where electric energy is available; it is always ready to operate immediately; it includes no boiler and requires no continuous heating and it supplies the coffee with unboiled water at the desired temperature.

According to my invention, my improved apparatus includes, as shown in a highly diagrammatic manner in FIG. 1, of the accompanying drawing, a container C of reduced contents, corresponding, say to one or two cups of coffee, connected with a tank or receptacle E carrying water and open to the atmosphere, said container being connected with the tank under the control of a valve Ve and being heated by an electric resistance R which is normally switched off. Said container C contains a thermostat T adjusted so as to stop the heating when a temperature of, say 95° C. is reached. The upper end of said container is connected through a normally closed valve Va with a bottle A containing compressed air or gas and provided with a pressure reducing valve M supplying said air or gas under the desired pressure. Lastly, the channel through which the water flows out of the container C into the conventional filtering support or percolator D containing a measured amount of ground coffee, is provided with a valve S which is normally held in its closed position by a spring resisting the weight of the water filling the container, while opening under the pressure of the compressed air when the latter is allowed to enter the container.

The container C being filled with water, a switch is closed for connecting the resistance R with the standard electrical lines. The rise in temperature is a very speedy rise, because the amount of water to be heated is very reduced. As soon as the desired temperature is reached, the thermostat T switches off the current. The valve Va, which allows the entrance of compressed air, is then opened after the valve Ve for the admission of water has been closed. The compressed air drives the water out through the ground coffee carried in the filtering support D. As soon as all the water has passed out of the container C, the reduction in pressure inside said container provided by the permeability of the coffee which has lost its water, produces an opening of the water admission valve Ve, together with a closing of the air admission valve Va.

The walls of the container C are preferably heat-insulated, so that the heat provided by the resistance R may be used to the utmost and so that the rise in temperature of the water may be more speedy. As to the tank E, it may be fed with water in any suitable manner, whether automatic or otherwise, and said tank or receptacle may feed a plurality of containers such as C, arranged in parallel.

My invention covers all the apparatus incorporating the above combination of parts and, in particular, it covers the embodiment illustrated in the accompanying drawings, wherein a single operation of a control knob produces the automatic sequence of the different stages forming a complete cycle of operation.

In said drawings:

FIG. 1 is a diagrammatic illustration of the principle underlying my invention, as disclosed hereinabove.

FIG. 2 is a vertical cross-section of the preferred embodiment referred to.

Figure 3:
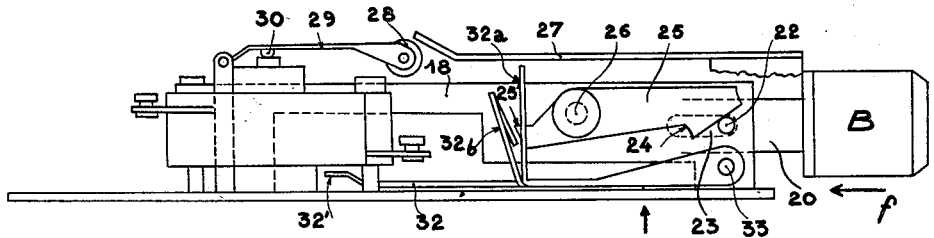
FIG. 3 is a side view of the upper section of said embodiment.

The cylindrical container C is bounded by double walls 1 and 2, surrounded by a heat-insulating layer 3. The heating resistance R is inserted between the two walls enclosing the container; the upper cover 4 carrying the seat of the water-admitting valve Ve and the lower cover 5 carrying the seat of the outlet-controlling valve S, constituted by a spring-urged ball, are interconnected by bolts 6 extending through the flanges 4' and 5' carrying the covers, so as to ensure the assembly of the different parts forming together the container C. The tube 7 of the thermostat extends through the cover 4 into the container C, while the filter 8 is formed by the inner part of the flange 5', which bears the lower end of the spring forming part of the valve S and is engaged, through the usual bayonet joint, by the support D carrying the ground coffee.

The upper section of the apparatus, including the water supply E and the automatic mechanism, is assembled over the lower section which has just been described by screwing the upper section seat 9 of the valve Ve.

The water enters the tank E through the port 10 and it is maintained at the desired level by the conventional needle valve system 11 controlled by the float 12. The valve Ve being normally opened by its spring 13, the container C is normally filled with water. The compressed air or gas supplied by the bottle A and the output of which is controlled by the needle valve 14, enters the container C through the chamber 15, the pipe 16, only a small section of which is illustrated, and the port 16', as soon as the valve Va is opened against the pressure of the spring 17, which holds valve Va normally in a closed condition.

Figure 4:
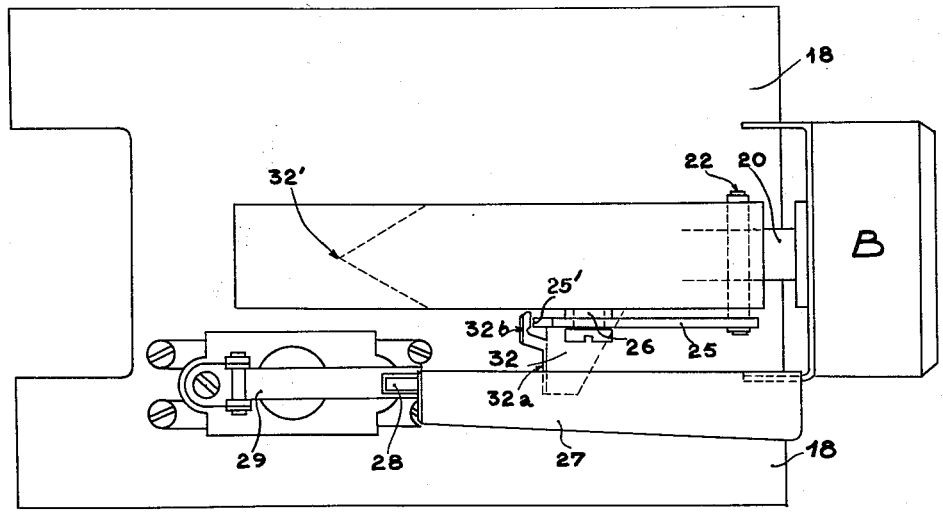
FIG. 4 is a corresponding plan view.

The upper member 18 of the upper section of the apparatus forms a cylindrical slideway 19 for the stem 20 of a control pusher knob B which is urged by a spring 21 into its inoperative position illustrated in FIGS. 2, 3 and 4. Pusher knob B carries a transverse pin 22 which is guided in the slot 23 of the slideway 19 and cooperates with the hook 24 formed on a lever 25 pivotally mounted at 26 on the upper member 18. When the pusher knob B is urged inwardly in the direction of the arrow f (FIG. 3), the pin 22 passes over and engages the hook 24 so that the lever 25 then holds the pusher knob in its set position, while the spring 21 remains in a compressed condition up to the end of the operative cycle.

The pusher knob carries, as shown in FIG. 3, a blade 27 which, upon depression of the knob, closes a precedingly open switch 30, said closing being operated by the engagement of said blade 27 with the roller 28 carried by a rocking arm 29 controlling switch 30, whereby the circuit provided for heating the resistance R is energized.

A lever constituted by a flat blade 32 is provided with bent lateral arms 32a and 32b and is pivotally secured at 33 to the upper member 18 of the apparatus and cooperates with a plurality of parts. It controls, in the first place, the water admission valve Ve (FIG. 2), the stem of which passes through an opening in the blade 32 and is provided with a collar 37 which is raised by the washer 38 inserted between said collar and said lever 32, when the latter is urged upwardly, as will be explained later, said upward movement of the lever 32 closing the valve Ve. The lever 32 cooperates also with the valve Va controlling the admission of compressed air, valve Va being opened by said blade 32 through the agency of the rod 41 which is urged upwardly into engagement with said valve Va. Said lever 32 also controls the switch 30 which it opens through its arm 32a as shown in FIGS. 3 and 4, raising the yielding blade 27 engaging the roller 28, which latter is thus released and allows the switch 30 to open, whereby the resistance R is de-energized as explained later. Lastly, the lever 32 controls the lever 25 engaging the pusher knob B, through its arm 32b engaging, when it is raised, the upper end of the nose 25' on the lever 25, whereby the pusher knob is subsequently released when the lever 32 has sunk again into its inoperative starting position at the end of the cycle and shifts the lever 25 away from the pin 22 on the pusher knob.

The free pointed end 32' of the lever 32 is housed inside a frusto-conical groove formed in one end of the freely moving member 34, the opposite end of which is similarly housed inside a frusto-conical groove formed in a stop 35 (FIG. 2). Stop 35 is adapted to slide axially in the upper member 18 and is held elastically in the position illustrated by one end of a spring 36. The latter engages through its other end a threaded plug 40 which allows, through the extent of its screwing into the upper member 18 an adjustment of the tensioning of the spring 36; this results in that, when the lever 32 occupies its lowermost position and is subjected to an upwardly directed thrust, it responds to the thrust thus imparted to it only if the latter is sufficiently energetic and, in this case, it passes, with a snap movement, from its lower position into its upper position, its return movement being also a snap movement.

The thermostat T controlling the position of lever 32 is illustrated, in the present case, as being of the expanding type including a tube 7 and a manometric casing 31, but it may obviously be of any other type. In the structure illustrated, the manometric casing acts directly on the lever 32. It is necessary to previously adjust, through screwing or unscrewing of the plug 40, the tensioning of the spring 36, so that the sudden passage of the lever 32 from its lower position into its upper position, as a consequence of the manometric expansion due to the increase in temperature of the water in the container C, may be obtained when the water reaches the desired temperature, say 95° C.

The lever 32, when shifted upwardly, plays several parts, to wit:

It closes the water input valve Ve by raising, through the agency of the washer 38, the collar 37 on the stem of the valve Ve extending through an opening in the lever 32;

It opens the valve Va for the input of compressed air by shifting upwardly the end of the stem 41 of said valve;

Its arm 32a raises the blade 27, which releases the roller 28, whereby the current heating the resistance R is switched off at 30;

Its arm 32b enters a position above the upper end of the nose 25' on the lever 25.

The operation of the arrangement is as follows: when inoperative, the parts occupy the positions illustrated in FIG. 2, the valve Ve being open, and the container C being filled with water. The pusher knob B, being then urged inwardly, engages the lever 25 and remains in the set position thus obtained throughout the cycle. The blade 27 on the pusher knob engages the roller 28 and closes at 30 a circuit through the resistance R, which is thus fed from the electrical current supply by a conventional plug and socket connection. When the water has reached the desired temperature, say 95° C., the lever 32, which has been subjected to a gradually increasing thrust exerted on it by the manometric casing 31 of the thermostat, rocks suddenly round its pivot 33 and enters its upper position, whereby the water input valve Ve is closed and, immediately afterwards, the air input valve Va is opened. At the same time, the arm 32a of the lever 32 raises the blade 27 so as to switch off at 30 the current heating the resistance R, while its arm 32b enters a position above the nose 25' of the lever 25 preparatory to the release of the pusher knob B. When the water has entirely flowed out of the container C, the air under pressure enters freely said container C and passes through the coffee grounds. The air pressure inside the container C drops and no longer urges the water input valve Ve into its closed condition. Since, in the meantime, the thermostat has cooled and its manometric casing 31 has collapsed sufficiently, the spring 13 of the valve Ve opens the latter again, which returns the lever 32 into its lower position, and allows the air input valve Va to close, while simultaneously the arm 32b of said lever 32 urges downwardly the nose 25' of the lever 25, of which the hook 24 releases the pusher knob B, which returns into its starting position. The cycle is now complete, the container C is again filled with water and it is sufficient to urge again the pusher knob B inwardly for the starting of the following operation.

An interesting feature of my improved apparatus may consist in that the knob B may be made of a translucent plastic material, illuminated by two small lamps of different colors, of which one is inserted shuntwise across the terminals of the apparatus, but is connected with the mains, so as to show that the apparatus is inoperative and ready to operate, while the other lamp is connected so as to be ignited when the pusher knob is pushed inwardly and the switch 30 is closed, in which case it shows the apparatus is operative.

What I claim is:

1. A machine for preparing coffee, comprising a container provided with an output port and adapted to contain the volume of water required for the production of a cup of coffee, a heating resistance for electrically heating only said container, a circuit for feeding the latter with electrical energy from the electrical current supply lines, a supply of cold water, a water-feeding pipe connecting said supply with the container, a normally open valve controlling said pipe, a spring-urged closing valve for the output port of the container, means for introducing air under pressure into the container to urge the water out of the latter through the spring-urged valve, and a filtering support for carrying a measured amount of ground coffee fitted over the output port and closing valve of the latter.

2. An automatic machine for producing coffee, comprising a container provided with an output port and adapted to contain the volume of water required for the production of a cup of coffee, a heating resistance for electrically heating only said container, a circuit for feeding the latter with electrical energy from the electrical current supply lines, a supply of cold water, a water-feeding pipe connecting said supply with the container, a normally open valve controlling said pipe, a spring-urged closing valve for the output port of the container, means for introducing air under pressure into the container to urge the water out of the latter through the spring-urged valve, a filtering support for carrying a measured amount of ground coffee fitted over the output port and closing valve of the latter, a hand-operable knob, means wherethrough said knob controls the circuit feeding the resistance, a thermostat controlling the last mentioned circuit-controlling means to open the circuit for a predetermined rise in temperature of the water in the container and means whereby the thermostat controls for said predetermined rise in temperature, the closing of the admission valve for the water and the opening of the valve admitting compressed air inside the container to urge water out of the latter.

3. An automatic machine for producing coffee, comprising a container provided with an output port and adapted to contain the volume of water required for the production of a cup of coffee, a heating resistance for said container, a circuit for feeding the latter with electrical energy from the electrical current supply lines, a supply of water, a water-feeding pipe connecting said supply with the container, a normally open valve controlling said pipe, a spring urged closing valve for the output port of the container, means for introducing air under pressure into the container to urge the water out of the latter through the spring-urged valve, a filtering support for carrying a measured amount of ground coffee fitted over the output and closing valve of the latter, a hand operable knob, means wherethrough said knob controls the circuit feeding the resistance, a thermostat controlling the last mentioned circuit-controlling means to open the circuit for a predetermined rise in temperature of the water in the container and means whereby the thermostat controls for said predetermined rise in temperature the closing of the admission valve for the water and the opening of the valve admitting compressed air inside the container to urge water out of the latter, means engaging the knob to hold it in its operative position, means urging the knob back into its inoperative position and means whereby the thermostat releases the knob engaging means.

4. An automatic machine for producing coffee, comprising a container provided with an output port and adapted to contain the volume of water required for the production of a cup of coffee, a heating resistance for said container, a circuit for feeding the latter with electrical energy from the electrical current supply lines, a supply of water, a water-feeding pipe connecting said supply with the container, a normally open valve controlling said pipe, a spring urged closing valve for the output port of the container, means for introducing air under pressure into the container to urge the water out of the latter through the spring-urged valve, a filtering support for carrying a measured amount of ground coffee fitted over the output and closing valve of the latter, a hand operable knob, means wherethrough said knob controls the circuit feeding the resistance, a thermostat including a manometric casing, a rocking lever engaged by said manometric casing adapted to snap out of an inoperative position into an operative position under the action of the thrust exerted by said manometric casing for a predetermined rise in temperature, said rocking lever controlling the last mentioned circuit-controlling means to open the circuit for a predetermined rise in temperature of the water in the container and means whereby said rocking lever produces in its operative position the closing of the admission valve for the water and the opening of the valve admitting compressed air inside the container to urge water out of the latter, means urging the knob back into its inoperative position, means whereby the rocking lever engages in its operative position the knob engaging means, and means whereby the valve controlling the water feeding pipe when returning in its normal condition upon emptying of the water out of the container through the spring-urged valve returns the rocking lever into its inoperative position engaging the collapsed manometric casing and the return of said rocking lever into its inoperative condition releases the knob-engaging means engaged by it to allow the return of the knob into its inoperative position.

References Cited in the file of this patent
UNITED STATES PATENTS 2,786,408    Herrera _____ Mar. 26, 1957

FOREIGN PATENTS 18,168    Great Britain _____ Dec. 30, 1915
520,472    Italy _____ Mar. 22, 1955